UNITED STATES PATENT OFFICE.

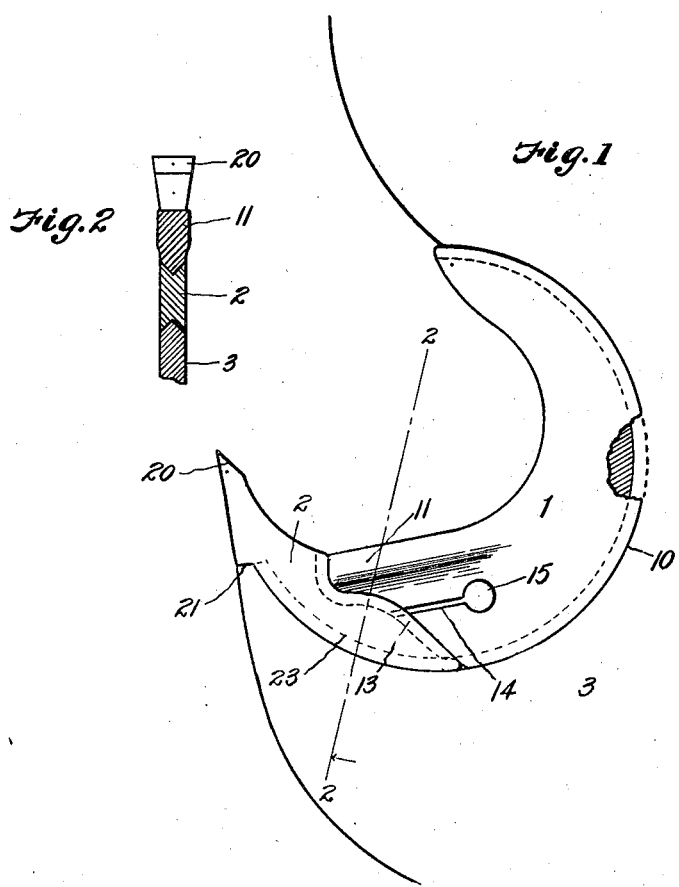

FRANK L. WOODCOOK, OF EVERETT, WASHINGTON.

INSERTIBLE SAW-TOOTH.

1,356,682. Specification of Letters Patent. Patented Oct. 26, 1920.

Application filed August 5, 1919. Serial No. 315,415.

*To all whom it may concern:*

Be it known that I, FRANK L. WOODCOOK, a citizen of the United States, residing at Everett, in the county of Snohomish and State of Washington, have invented a new and useful Improvement in Insertible Saw-Teeth, of which the following is a specification.

This invention relates to saws and particularly to that type of circular saws which employs inserted teeth.

The object of the invention is to provide a construction for the inserted parts which will hold them more securely and which will otherwise be improved over former constructions.

In the accompanying drawings I have shown my invention by the illustration of one inserted tooth which embodies my improvement.

Figure 1 is a side view, in perspective, of one inserted tooth and its relation to a circular saw body.

Fig. 2 is a section taken on line 2—2 of Fig. 1.

The body of the saw is provided with circular notches or recesses about its perimeter, after the common practice. An inserted tooth and a locking segment are used in each of these recesses, these in a broad way being much like those which have heretofore been used, but differing in certain details whereby the teeth are more securely held in place.

The outer circular edges of both locking segment 1 and tooth 2, are grooved as indicated at 10 and 23, and the engaging edges of the recesses in the saw are complementally beveled. The end edges of the locking segment 1 which contact with the inner edges of the tooth 2, and the said edges of the tooth 2, are similarly provided with complemental beveled and grooved edges, so that they are locked securely against lateral displacement. The section shown in Fig. 2 illustrates this construction.

The locking segment 1 is provided with a slot 14 terminating in a hole 15 by which a spanner or wrench may be engaged therewith to turn it and the tooth 2 when inserting them in or removing them from their seat. Preferably the locking segment 1 is thickened somewhat in a section located at 11. The tip 20 of the tooth is shown as widened, in accordance with common practice.

I claim as my invention:—

An inserted tooth construction for saws comprising a saw having circular recesses in its edge, a tooth member and a segmental locking member having outer edges curved to fit the edges of said recess, the engaging edges of tooth and locking member being shaped to provide an arm on the locking member which overlaps the inner side of the tooth, the meeting edges of tooth, locking members and saw being throughout their extent complementally grooved and ribbed to prevent relative lateral movement.

FRANK L. WOODCOOK.